Sept. 29, 1925.
D. S. DE LAVAUD
1,555,713
AUTOMATIC SPEED CHANGE MECHANISM
Filed July 7, 1924    2 Sheets-Sheet 2
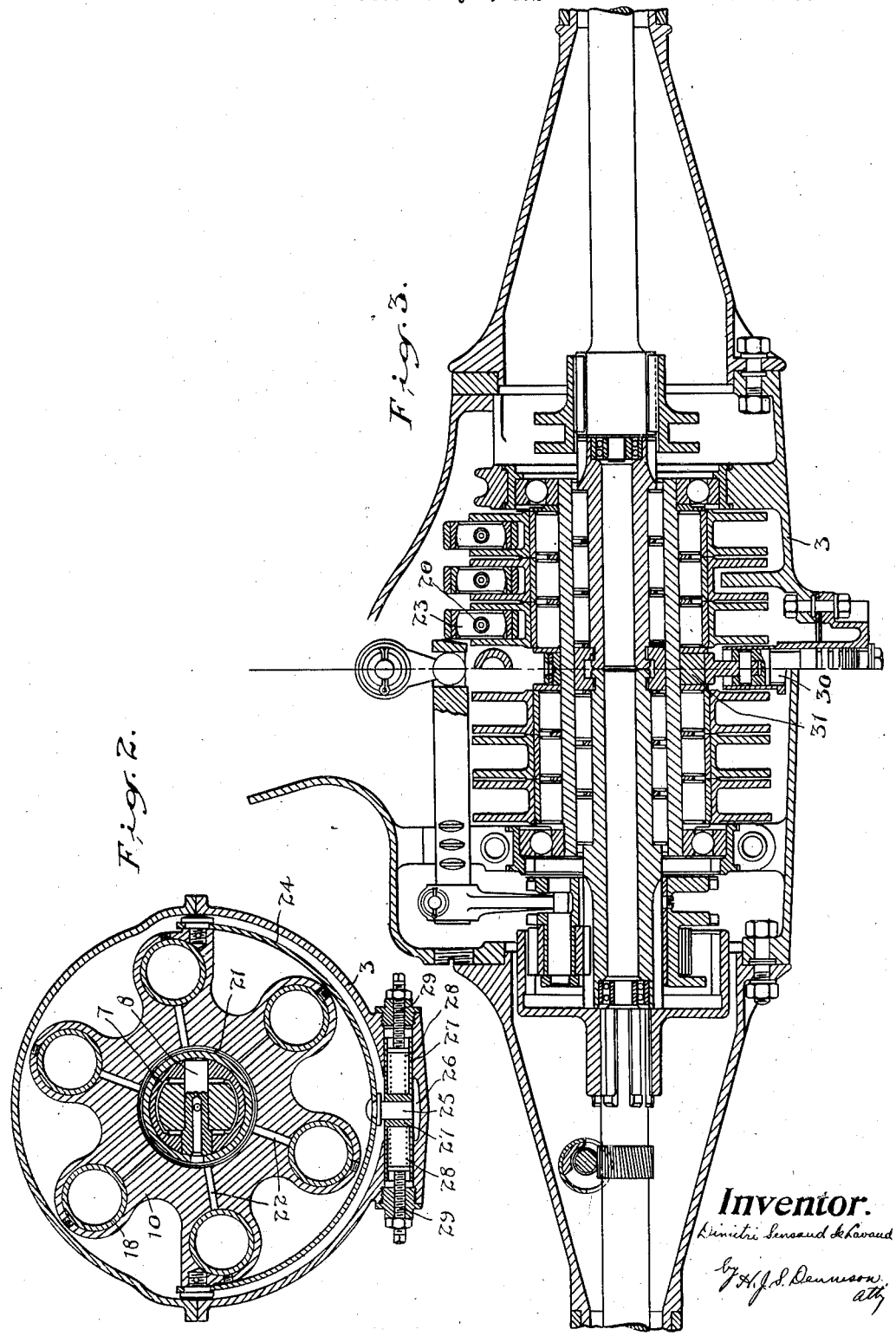
Inventor.
Dimitri Sensaud de Lavaud
by H. J. S. Dennison
atty Patented Sept. 29, 1925.

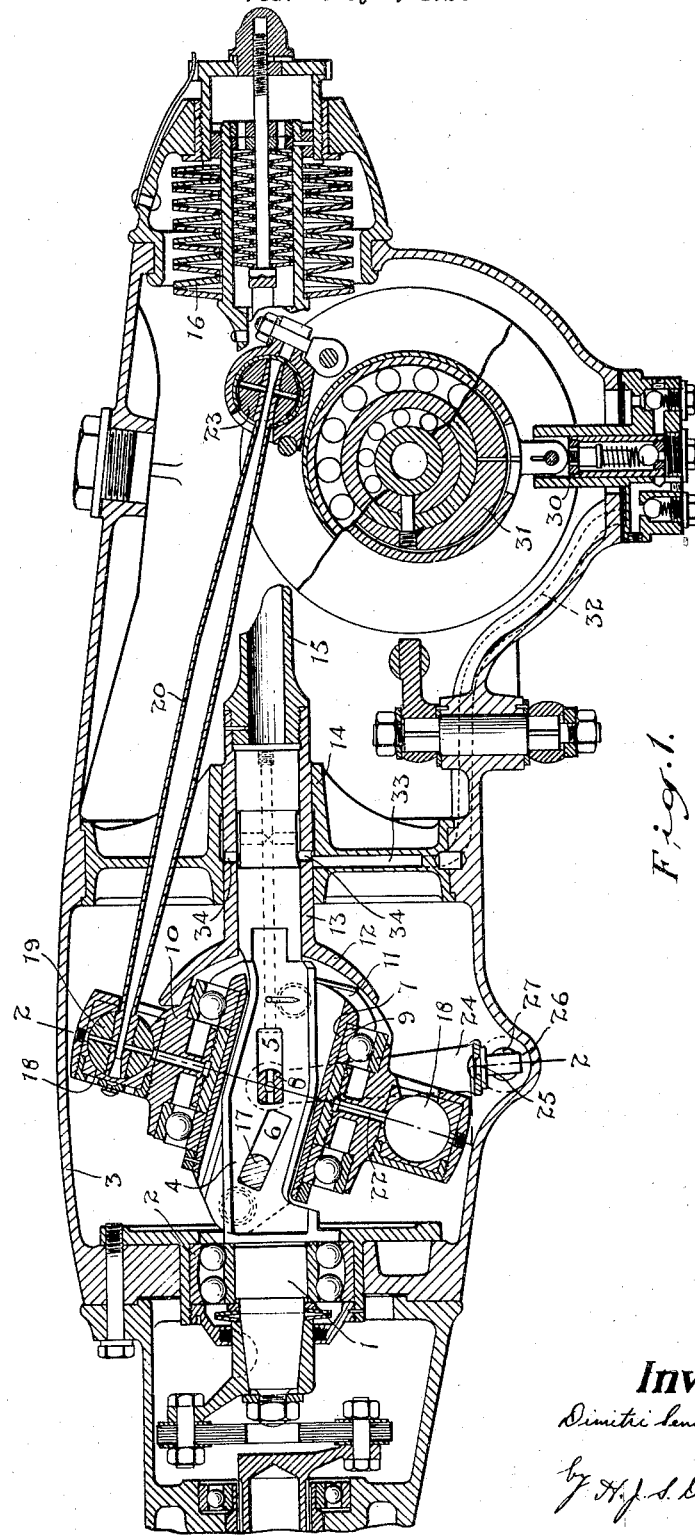

1,555,713

UNITED STATES PATENT OFFICE.

DIMITRI SENSAUD DE LAVAUD, OF PARIS, FRANCE.

AUTOMATIC SPEED-CHANGE MECHANISM.

Application filed July 7, 1924. Serial No. 724,613.

*To all whom it may concern:*

Be it known that I, DIMITRI SENSAUD DE LAVAUD, a citizen of the United States of Brazil, and resident of the city of Paris, in the Republic of France, have invented certain new and useful Improvements in an Automatic Speed-Change Mechanism, as described in the following specification, and illustrated in the accompanying drawings, that form part of the same.

The principal objects of this invention are, to devise an improvement in the type of a transmission mechanism which utilizes an oscillatable member rotatably connected with the drive shaft to operate a plurality of reciprocable members to impart motion to the driven shaft, particularly in the transmission of the angular thrust of the oscillatable member to the elastic compensating resistance, and further, in providing an elastic means for suppressing the rotation of the oscillatable member and to generally improve the lubricating system.

The principal features of the invention consist in the novel construction and arrangement of co-acting spherical surfaces on the oscillatable member and the tubular connection between the oscillatable member and the resisting couple and whereby the rotation of the oscillatable member is restrained by laterally disposed adjustable spring members.

A further important feature consists in the novel arrangement of oil ducts extending from the central shaft to radial ducts in the oscillatable member which communicate with the journal ends of the reciprocating members through said members being formed hollow.

In the drawings. Figure 1 is a longitudinal mid-sectional view partly broken away of my improved mechanism.

Figure 2 is a cross sectional view through the line 2—2 of Figure 1.

Figure 3 is a part horizontal and part vertical section of the driven shaft and its supports and driving connections.

In the construction illustrated the driving shaft 1 is journaled in the bearings 2 in the casing 3 and the angular portion 4 thereof is provided with the axial slot 5 and an angularly disposed longitudinally arranged slot 6.

A sleeve 7 is pivotally mounted on a pin 8 slidably arranged in the slot 5 and said sleeve supports the bearings 9 which carry the oscillating disc 10.

A convexed part spherical surfaced flange 11 is arranged at the rearward side of the disc 10 and engages the concaved face of a cupped member 12 of a corresponding curvature, both convexed and concaved surfaces being concentric to the axis of the pin 8.

The cupped member 12 forms part of the sleeve 13 slidably arranged in the bearing member 14 arranged within the casing 3 and said sleeve is connected to a tubular member 15 which operates against the elastic resisting couple 16 formed by a plurality of Belleville discs adjustably arranged at the rear end of the casing.

The oscillations of the disc 10 are opposed by the elastic couple 16 through the tube and such oscillation is governed by the movement of the pin 8 in the axial slot 5 and the co-operation of a pin 17 extending transversely of the sleeve 7 and engaging the angle slot 6 in the driving shaft.

The functioning of the pin 17 in the angle slot 6 has been previously disclosed and it is not necessary to submit any dissertation on its peculiar operation in this specification, suffice it to say, that according to the torque in the driven shaft the resistance to the inclination of the oscillating disc is varied and accordingly as that resistance varies the location of the pin 17 in the angularly disposed slot is altered.

The disc 10 is provided with a plurality of spherical pockets 18 in which the spherical blocks 19 are journalled, said blocks forming the means for connecting the reciprocating rods 20 to the disc.

The pin 8 is hollow and has a transverse opening therethrough and oil forced into the slot 5 flows through the pin to the circumferential groove 21 in the inward side of the disc and from this groove 21 a plurality of radial channels 22 are directed to the pockets 18.

The blocks 19 are bored transversely to communicate with the channels 22 and the rods 20 are hollow and at the opposite end said rods have secured thereto the spherical blocks 23 which are bored transversely so that oil is distributed over the wearing surfaces of the spherical blocks at both ends.

The disc 10 has secured to its outer perimeter the ends of a yoke member 24 which is provided with a pin 25 centrally arranged and this pin extends into a transverse recess 26 in the bottom of the casing 3.

Within the recess 26 are arranged a pair of pistons 27, the heads of which engage the pin 25 and said pistons contain the spiral compression springs 28, the tension of which is adjusted by means of the screws 29.

By means of the yoke and spring piston arrangement described the rotative tendency of the disc 10 is flexibly cushioned and any stresses incident to the tendency to rotate will thus be relieved.

The oiling of the structure is effected by means of a pump 30 arranged in the bottom of the casing 3 below the driven shaft, the pump piston being operated by an eccentric 31 encircling the driven shaft. The oil is forced through a channel 32 in the casing to a passage 33 in the bearing member 14 and it is conducted through holes 34 in the sleeve 13 to transverse holes and a longitudinal passage in the driving shaft 1 communicating with the axial slot 5.

It will be seen that as the driven shaft rotates the oil is forced through all of the bearings of the oscillating disc and its connecting members.

What I claim as my invention is:—

1. In an automatic speed change mechanism the combination with the driving and driven shafts, of an oscillatable member rotatably mounted on said driving shaft and longitudinally movable thereon and operatively connected with the driven shaft, a slidable member operatively connected with said oscillatable member, a flexible resisting member engaging said slidable member, and means for shifting the axis of said oscillatable member in accordance with its longitudinal movement on said driving shaft.

2. In an automatic speed change mechanism, the combination with the driving and driven shafts and an oscillatable member rotatable on the driving shaft and having its axis movable thereon and operatively connected with the driven shaft, of a member slidably supported in axial alignment with the driving shaft and having a spherical concaved surface co-axial with the axis of the oscillatable member, a convexed surface carried on the oscillatable member and engaging the concaved surface, and an elastic resisting couple operatively engaging said slidable member.

3. In an automatic speed change mechanism, the combination with the driving and driven shafts and an oscillatable member rotatable on the driving shaft and having its axis movable thereon and operatively connected with the driven shaft, of a member slidably supported and slidably engaging said oscillatable member, and an elastic resisting couple co-operating with said slidable member, and means secured to said oscillatable member adapted to yieldingly resist the turning of said oscillatable member.

4. An automatic speed change mechanism, driving and driven shafts and an oscillatable member rotatable on the driving shaft and having its axis movable thereon and operatively connected with the driven shaft, a member slidably supported and slidably engaging said oscillatable member, an elastic resisting couple co-operating with said slidable member, a yoke connected to said oscillatable member in alignment with its oscillating axis, an extension from said yoke, and spring members arranged in opposition and engaging said extension from said yoke to yieldingly resist the turning of the oscillatable member.

5. An automatic speed change mechanism, driving and driven shafts and an oscillatable member rotatable on the driving shaft and having its axis movable thereon and operatively connected with the driven shaft, a member slidably supported and slidably engaging said oscillatable member, an elastic resisting couple co-operating with said slidable member, a yoke connected to said oscillatable member in alignment with its oscillating axis, an extension from said yoke, a cylindrical recess arranged in alignment with the yoke, pistons arranged in said recess and engaging said projection from the yoke at either side, springs within said pistons, and means for regulating the pressure of said springs.

6. In an automatic speed change mechanism, a drive shaft having a longitudinal slot and a longitudinal orifice leading from said slot, means for pumping oil through said longitudinal orifice into said slot, an oscillatable member, a pin slidable in said slot and pivotally supporting said oscillatable member, said pin having an orifice therethrough, a plurality of ducts in said oscillatable member communicating with the orifice in said pin, a plurality of sockets in said oscillatable member connected with said ducts, blocks rotatably mounted in said sockets and having oil channels therein communicating with the ducts in the aforesaid member, hollow rods secured in said rotatable blocks, and means connected to the other ends of said hollow rods for operating the driven shaft.

DIMITRI SENSAUD DE LAVAUD.